Feb. 26, 1924. 1,485,226
K. R. HUGERSHOFF
THEODOLITE FOR MAKING ANGULAR DETERMINATIONS DIRECT FROM PHOTOGRAMS
Filed Nov. 6, 1919  5 Sheets-Sheet 1

Witnesses:

Inventor
Karl R. Hugershoff
by
Attorney

Feb. 26, 1924.

K. R. HUGERSHOFF 1,485,226

THEODOLITE FOR MAKING ANGULAR DETERMINATIONS DIRECT FROM PHOTOGRAMS

Filed Nov. 6, 1919

Feb. 26, 1924.　　　　　　　　　　　　　1,485,226
K. R. HUGERSHOFF
THEODOLITE FOR MAKING ANGULAR DETERMINATIONS DIRECT FROM PHOTOGRAMS
Filed Nov. 6, 1919　　　　5 Sheets-Sheet 4

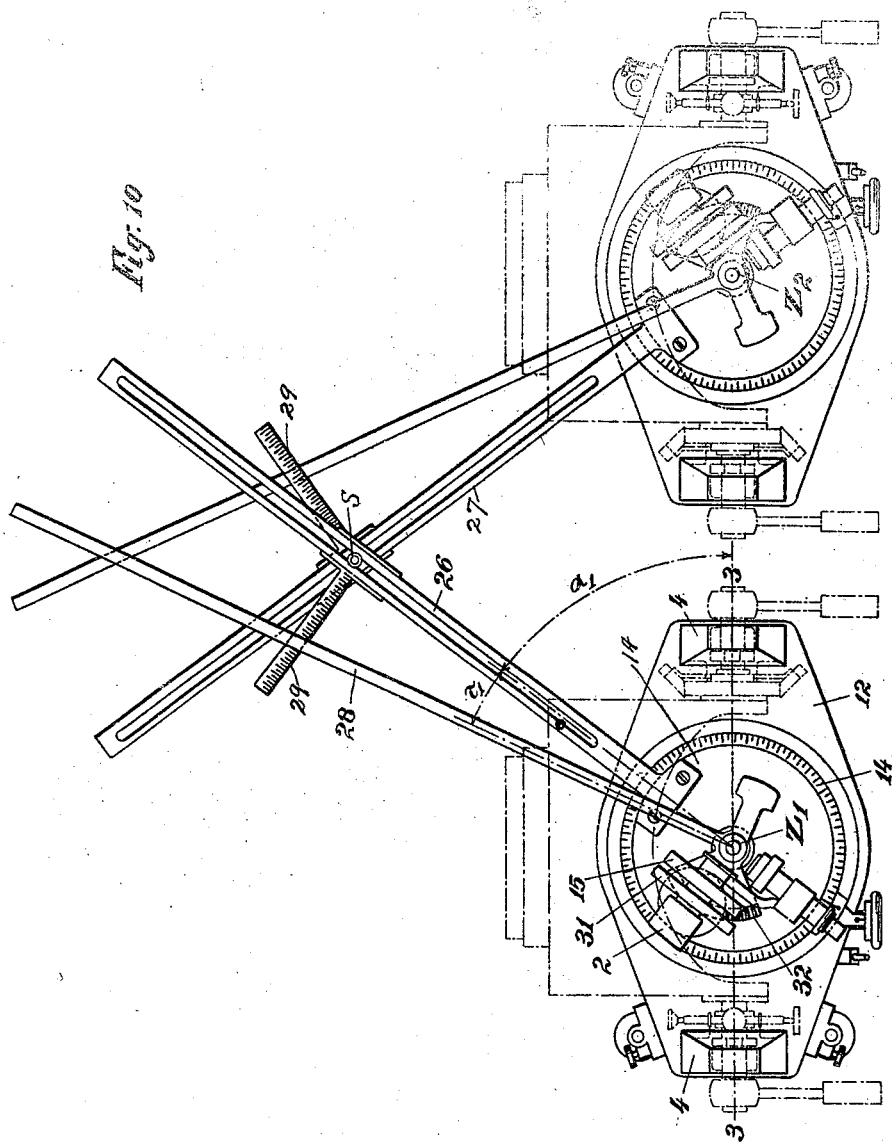

Patented Feb. 26, 1924.

1,485,226

UNITED STATES PATENT OFFICE.

KARL REINHARD HUGERSHOFF, OF THARANDT, GERMANY.

THEODOLITE FOR MAKING ANGULAR DETERMINATIONS DIRECT FROM PHOTOGRAMS.

Application filed November 6, 1919. Serial No. 336,229.

*To all whom it may concern:*

Be it known that I, KARL REINHARD HUGERSHOFF, citizen of the German Republic, residing at Tharandt, Saxony, Germany, Talmuhlenstr. 4$^B$, have invented certain new and useful Improvements in Theodolite for Making Angular Determinations Direct from Photograms, of which the following is a specification.

This invention relates to a graphical method of determining the situation and altitude of one or more image points on two similar photographic exposures of a landscape, in which two angle measuring instruments, known as theodolites, are operatively connected to pivoted protractor arms movable over a horizontally-positioned topographical map.

An object of this invention is to provide a means for determining the exact relative position and elevation, on a map, of one or more image points on a photographic plate of a landscape.

Another object is to provide an adjustable photographic plate holder positioned in front of the theodolite in such manner that the vertical distance of the photograph from the inter-section point of the vertical and tilting axes of said theodolite can be made exactly equal to the image extent of the camera used in taking the said photograph.

A further object is to provide two independent pivotally mounted theodolites, each operatively connected to a protractor having an extending arm or ruler; each ruler having an axial slot, and connected to the other near its outer end by a hollow pin slidable in said slots.

Still another object is to provide a means for plotting on a map the horizontal angular positions of two such theodolites operatively connected to two pivoted protractors having superposed slotted rulers, and the vertical angular position of one of said theodolites similarly connected to an altitude ruler cooperating with its protractor arm.

Like numerals refer to like parts throughout the several views.

With these and other objects in view, the invention consists in the construction and combination of parts substantially as disclosed in the drawings, in which:—

Figure 10 is a plan view of the protractor disks and the altitude rulers pivoted on the theodolite supporting base.

Figure 1:
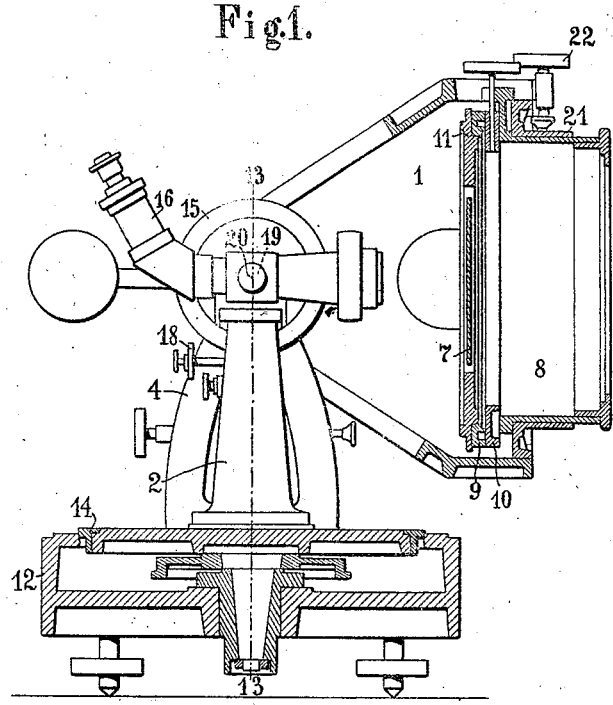
Figure 1 is a part sectional view of the computing theodolite.
Figure 9:
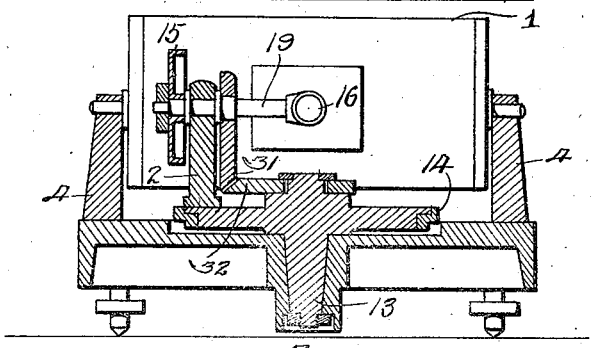
Figure 9 is a sectional view of the theodolite mounting on the pivoted protractor disk, and the geared connection of the altitude ruler with the telescope supporting shaft.
Figure 2:
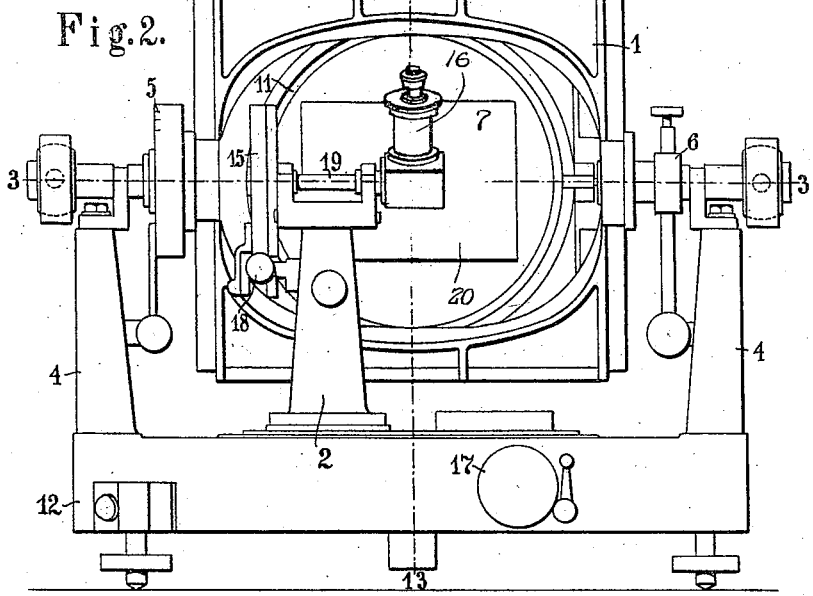
Figure 2 is a rear elevation.
Figure 3:
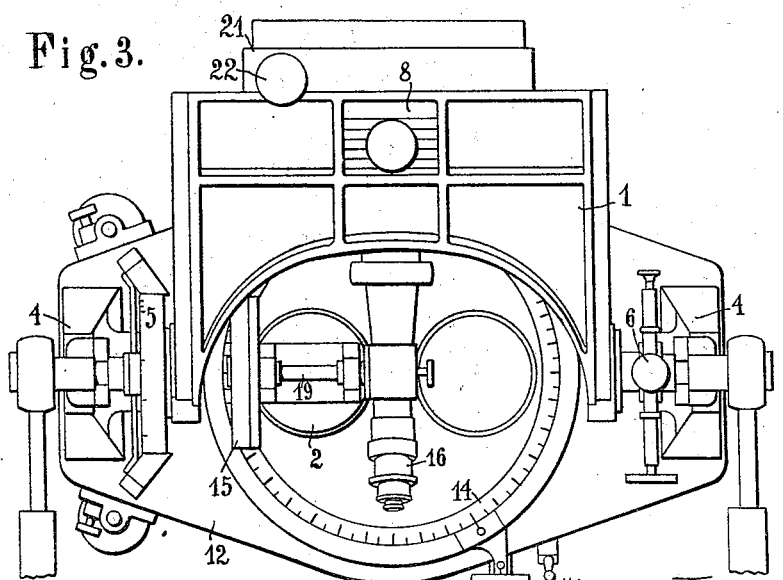
Figure 3 is a top plan view of the same.

The invention consists essentially of three main parts the adjustable photographic plate holder 1, Fig. 1, the geared theodolite 2, and the pivoted protractor device 14 and 32, Figs. 9 and 10. The photograph holder 1 is pivotally mounted in the uprights 4 and rotatable on the horizontal axis 3—3, Fig. 2; its angle of inclination being indicated on the graduated disk 5, while the set-screw 6 secures the holder 1 in the desired position. The photogram 7, Fig. 4, (negative or dispositive) from which angular determinations are to be made, is placed in the slide 9, Fig. 1, of the focusing tube 8 slidable in a supporting cylinder 21. Slide 9 is attached to a toothed rim 10 for angular adjustment of the photogram 7 normal to the line of sight. The above means provide for adjusting the photogram in any direction. A supporting base 12 carries a pivoted protractor disk 14, Fig. 9, graduated in degrees and having mounted on said disk 14 a post 2 pivotally supporting the telescope 16 secured to a horizontal shaft 19 and provided with coarse and fine adjusting wheels 15 and 18. The shaft 19 is so positioned that its tilting axis coincides with the axis 3—3 of the photogram holder 1. Integrally attached to, and extending horizontally-outward from the protractor disk 14, Fig. 10, is a slotted arm or ruler 26. An altitude ruler 28 having a toothed sector arm 32, is pivotally mounted immediately above, and on the same axis, as the disk 14, the teeth of said sector arm 32 meshing with the toothed sector 31 keyed to shaft 19 of the theodolite 2.

Figure 4:
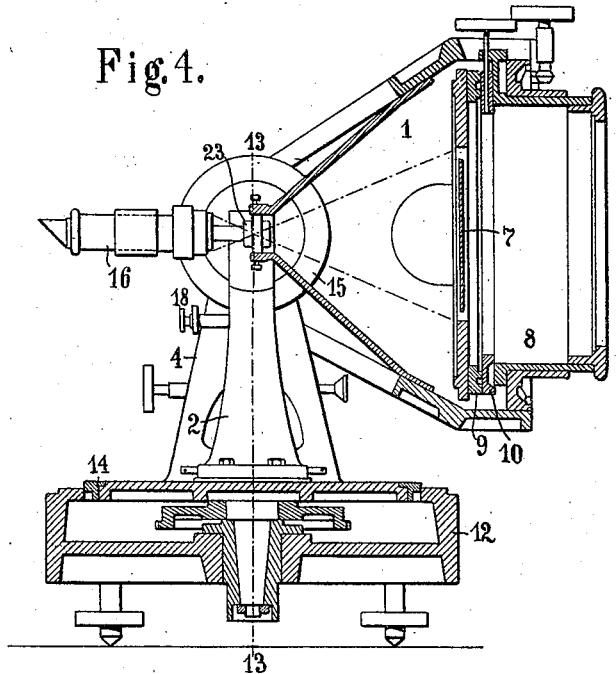
Figure 4 is a sectional side elevation of a modified construction of the device.
Figure 5:
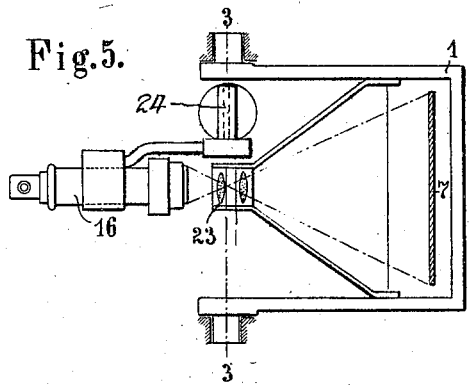
Figure 5 is a diagrammatical view through the horizontal axis of the theodolite telescope.

In the modified construction shown in Figs. 4 and 5, the lens system of the telescope 16 is rigidly secured to the pivoted photogram holder frame 1, and is positioned at the intersection point of the vertical axis 13—13, Fig. 4, and the horizontal axis 3—3, Fig. 5.

In operation, the developed photographic plate, or photogram, from which angular determinations are to be made is placed in the opening of the slide 9, and positioned in front of the theodolite telescope 16 in such manner that the vertical distance of the plate from the intersection point of the vertical and tilting axes of the theodolite will be exactly equal to the focal length of the exposure camera. By pointing the telescope 16 on any desired image point on the photogram 7, the location and elevation of said point can be determined from the horizontal and vertical angles read off in degrees from the graduated disks 14 and 15, respectively.

Figure 6:
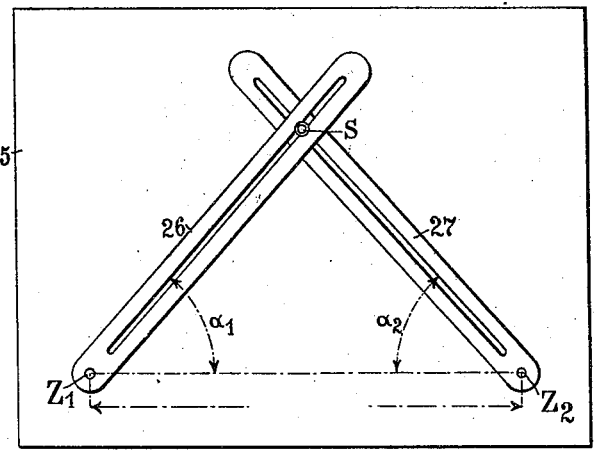
Figures 6, 7 and 8 show the arrangement of the protractor rulers for the graphical illustration of the situation and altitude of the image point on the photographic plate.

By employing two theodolites, the position and altitude of any image point on the photogram can be graphically fixed. In this method, two similar photographs of the same tract of land, taken from two standpoints, are used, each being placed in a separate theodolite determining device. After adjusting the photographs for their proper focal length each theodolite is adjusted so that the tilting axis 3—3 lies normal to the plane of the photogram 7. In this position, the ruler 26, Fig. 10, will lie parallel with the line of sight through the telescope 16. Similarly, ruler 27 of the other theodolite will lie parallel with its telescope. If, therefore, photogram 7 was taken by a camera at the standpoint $Z^1$, and the other photogram, at standpoint $Z^2$, and, if each telescope be sighted on the same image point on its photogram, the ruler 26 will lie at the angle $a^1$ with the axis 3—3, Fig. 6, and ruler 27, at the angle $a^2$ with the same axis. If these two rulers be superposed and a hollow pin S, Fig. 6, arranged to slide in the respective slots, the location of the point S will correspond to that of the selected image point in the photogram, and can be plotted directly on a map secured to a drawing board 25 positioned as shown.

Figure 7:
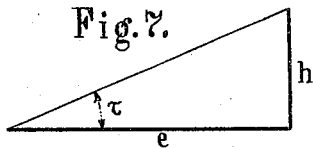
Figure 8:
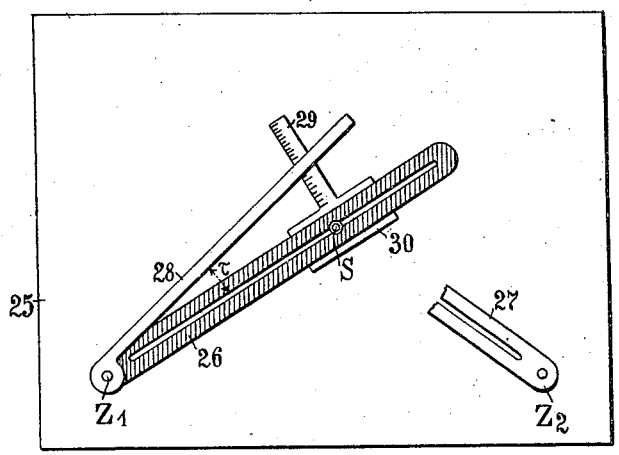

In other words, the horizontal angular movements executed of the rulers 26 and 27 are the same as the movements executed by the telescope of the respective theodolites when being sighted on the same image point in both photograms. The altitude of the point S is determined by the altitude arm 28, with its graduated altimeter 29 having a base 30 slidable on ruler 26, which swings through the same arc as that of the telescope 16 in its vertical movement from the horizontal to its line of sight on said image point. This is the angle $t$, Figs. 7 and 8.

Having described my invention, what I claim as new and desire to secure by Letters Patent, is:—

1. In a theodolite for making angular determinations direct from photograms, the combination of a base having uprights rigidly secured thereto, a photographic plate holder pivotally mounted in said uprights, means for adjusting said holder in any direction, a horizontal angle measuring disk rotatably mounted in said base and a vertical angle measuring device supported on said disk.

2. In a theodolite for making angular determinations direct from photograms the combination of a base having uprights rigidly secured thereon, a photographic plate holder pivotally mounted in said uprights, means for adjusting said holder in any direction, a horizontal angle measuring disk rotatably mounted in said base, a post rigidly secured to said disk, a theodolite telescope pivotally mounted on said post, said telescope having a lens system positioned in front of the photographic plate holder so that the front main point of said lens system coincides with the intersection of the pivotal axis of the photographic plate holder, the pivotal axis and the vertical axis of the theodolite telescope.

3. The combination with two theodolites each provided with a rotatable disk for measuring horizontal angles of slotted arms secured at one end to said disks having their outer ends superposed and means for connecting said superposed ends whereby the position of the point of intersection of said slots may be varied and readily ascertained.

4. The combination with two theodolites each provided with a rotatable disk for measuring horizontal angles of slotted arms secured at one end to said disks having their outer ends superposed and a hollow pin passing through said superposed ends whereby the point of intersection of said slots may be readily indicated on plotting paper placed below said arms.

5. In a theodolite for making angular determinations direct from photograms the combination of a base, a horizontal angle measuring disk rotatably mounted in said base, a vertical post mounted on said disk, a telescope pivotally supported in said post about a horizontal axis, an altitude measuring device pivotally mounted on said disk for independent rotatable movement, means operatively connecting the horizontal axis of the telescope and said device, said device including a horizontally extending ruler, said disk having a horizontally extending slotted arm, and a graduated scale mounted on said arm adapted to coact with said ruler to indicate the angular movement of the telescope in a vertical plane.

6. The combination with two theodolites, each provided with a base having uprights rigidly secured thereto, of a photographic plate holder pivotally mounted in said uprights, means for adjusting said holder in any direction, a horizontal angle measuring disk having a horizontally extending slotted arm rotatably mounted in said base, a post secured to said disk, a telescope having a drawing board with a plot map mounted thereon and positioned just beneath the horizontal arm and means for plotting points on the map corresponding to similarly positioned image points in the photogram, and means for determining the altitudes of said plotted points with respect to the elevation of the exposure cameras.

7. In a theodolite for making angular determinations direct from photograms, the combination of a base, a horizontal angle measuring disk rotatably mounted in said base, a vertical post mounted on said disk, a telescope pivotally supported in said post about a horizontal axis, an altitude measuring device pivotally mounted on said disk for independent rotatable movement and means for communicating the movements of the telescope about said horizontal axis to said device.

In testimony whereof I have hereunto set my hand in presence of two subscribing witnesses.

KARL REINHARD HUGERSHOFF.

Witnesses:
EGON G. HOLL,
ARTHUR REINSCH.